(12) United States Patent
Hiramatsu et al.

(10) Patent No.: US 8,237,322 B2
(45) Date of Patent: Aug. 7, 2012

(54) SQUIRREL-CAGE ROTOR FOR AN ELECTRIC MOTOR AND ITS PRODUCTION METHOD

(75) Inventors: Hiromichi Hiramatsu, Yokohama (JP); Seiichi Baba, Kamakura (JP); Toru Sakai, Chiba (JP); Takeshi Abe, Narashino (JP); Kazuhide Ebine, Narashino (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 12/820,739

(22) Filed: Jun. 22, 2010

(65) Prior Publication Data

US 2011/0074240 A1    Mar. 31, 2011

(30) Foreign Application Priority Data

Sep. 30, 2009 (JP) ................................. 2009-228339

(51) Int. Cl.
*H02K 17/00* (2006.01)
(52) U.S. Cl. ......................................... 310/211; 29/596

(58) Field of Classification Search ................... 310/211, 310/411–413, 427, 432; 29/596
See application file for complete search history.

(56) References Cited

U.S. PATENT DOCUMENTS

| 3,965,382 | A  | * | 6/1976  | McCrosky et al. ............. 310/51 |
| 4,893,044 | A  | * | 1/1990  | Bush et al. ...................... 310/51 |
| 5,283,941 | A  | * | 2/1994  | Meyer et al. .................... 29/598 |
| 6,081,052 | A  | * | 6/2000  | Hosoe et al. ............... 310/12.23 |
| 6,396,188 | B1 | * | 5/2002  | Kliman et al. ............. 310/261.1 |
| 7,073,247 | B2 | * | 7/2006  | Rowe et al. ...................... 29/596 |
| 7,531,934 | B2 | * | 5/2009  | Hang et al. ............... 310/156.56 |
| 2006/0267441 | A1 | * | 11/2006 | Hang et al. ..................... 310/211 |
| 2008/0150400 | A1 | * | 6/2008  | Crowell ...................... 310/60 R |

FOREIGN PATENT DOCUMENTS

| JP | 07-143709 | 6/1995 |
| JP | 2007-336737 | 12/2007 |

* cited by examiner

*Primary Examiner* — Thanh Lam
(74) *Attorney, Agent, or Firm* — McDermott Will & Emery LLP

(57) ABSTRACT

To provide a well balanced squirrel-cage rotor for an electric motor, quantities of braze used to bond various rotor components are different from each other so as to serve as balance weight in order to improve balance.

13 Claims, 20 Drawing Sheets

Braze 24A ≠ Braze 24B

Braze 24A ≠ Braze 24B

Braze 24A ≠ Braze 24B

FIG.14B
FIG.14A
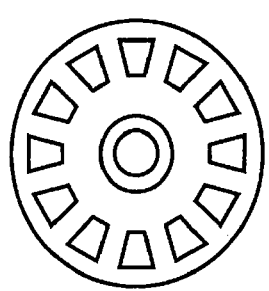
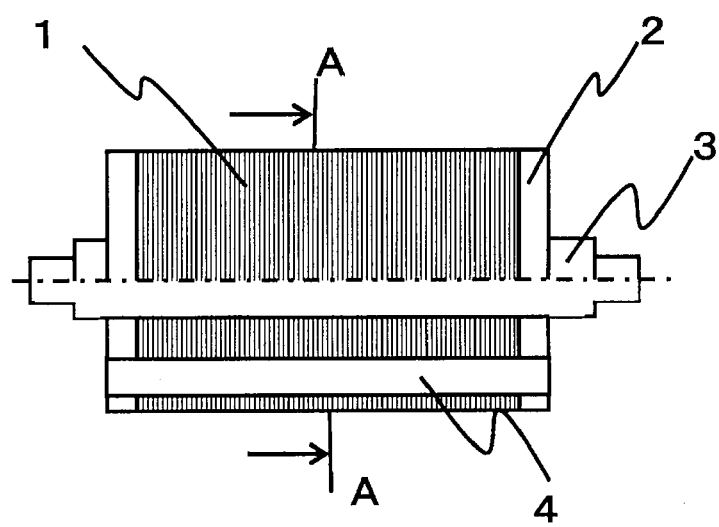
PRIOR ART

A-A section

PRIOR ART

SQUIRREL-CAGE ROTOR FOR AN ELECTRIC MOTOR AND ITS PRODUCTION METHOD

RELATED APPLICATION

This application claims the benefit of priority from Japanese Application No. JP-2009-228339 filed on Sep. 30, 2009 entitled "Squirrel-cage Rotor for an Electric Motor and Its Production Method," the disclosure of which also is entirely incorporated herein by reference.

TECHNICAL FIELD

The present subject matter relates to squirrel-cage rotors for electric motors and production methods which improve rotor balance.

BACKGROUND

For different kinds of electric rotary motors, various measures have been taken to improve motor efficiency. With regard to rotors, improvement by transpositions of materials of electromagnetic steel plates used as core parts or conductor bars and improvement in the space factor of conductor bars or modifications of shapes of cores are being considered.

A prior art example of a rotor for an electric motor is shown in FIGS. 14A, 14B and 15. A core 1 includes a plurality of thin electromagnetic steel plates. As shown in FIG. 15, each of the core plates has a core shaft hole 12 at the center and a plurality of approximately trapezoidal core slots 11 arranged circumferentially. The plates are laminated to each other to form the core 1.

The rotor also includes end rings 2 whose shapes are approximately the same as the plates of the core 1. The end rings 2 are attached at both sides of the core 1 in the shaft axis direction. The rotor shaft 3 extends through the core shaft holes 12 of the core plates and through the corresponding holes of the two end rings 2. The core slots 11 of the core 1 and the end rings 2 accommodate the conductor bars 4, so that the conductor bars 4 extend through core slots 11 of both the core 1 and end rings 2. In this arrangement, a squirrel-cage rotor for an electric motor is manufactured by joining the end rings 2 and conductor bars 4 by brazing or other various kinds of methods to provide electrical continuity throughout.

For this rotor structure, the end rings 2 and the conductor bars 4 are prepared as separate parts; and they are bonded together after the core 1 is assembled. Alternatively, a die-casting process may be used as another option. In the die-casting process, the end rings 2 and the conductor bars 4 are made directly by forcing molten metal into core slots 11 which are regarded as cavities for casting purposes.

Rotary imbalance of the squirrel-cage rotor produced by the above processes is one factor in vibration and noise in an electric motor that uses such a rotor. Hence, modifications of the rotor are conducted in order to reduce such imbalance and thereby improve balance and reduce motor vibration. These modifications for balance are becoming essential due to recent requirements for higher efficiency.

There are two different methods for modifications of the rotor for improving balance. One balancing approach is to cut part of the rotor by drilling or shaving to remove weight, and the other approach is to attach one or more balance weights. The drilling or shaving approach may be chosen unless wastes by cutting causes problems, and the use of balance weights may be chosen if the waste matter is disadvantageous.

Explanation is given of an example of the method of attaching balance weights hereinbelow. In order to reduce the number of parts and the number of steps for attaching the parts together, a plurality of balance weights are manufactured in the form of ring-shaped plates at the center of each of which is a hole. These plates, however, have respectively different thicknesses and therefore different mass and weight. A projection is formed at a surface of the edge of the rotor so that the projection can be fitted into the central hole of any of the balance weights.

After measuring quantity of imbalance of a rotor without balance weights, one or a plurality of the ring-shaped balance weights are fitted onto the projection so as to improve balance within the prescribed range to offset the quantity of imbalance. In a case where a plurality of balance weights are attached, a plurality of balance weights whose thickness are the same or are respectively different are available. To prevent detachment, the ring-shaped balance weights are kept attached to the projection of the rotor, for example, by caulking. Alternatively, apart of the projection from the surface of the rotor is deformed to be larger than the central hole of the attached weight (s).

Regarding this problem of rotor modification to improve balance, reducing the number of manufactured parts and simplifying assembly procedures are desirable. For example, a method of applying putty to an outer surface of the coils and hardening the putty has been proposed. However, this balancing technique has a potential for the putty to detach due to centrifugal force. Putty detachment has occurred especially when the attaching force of putty has been weakened by deterioration of the putty over time.

In view of the above mentioned detachment problem, JP-A-H07-143709A proposes that a cylinder is attached to a component of rotor and putty intended to improve balance is applied and hardened on an inner surface of the cylinder. This structure has solved the detaching putty problem because the putty at the inner surface is being forced against the inner surface by centrifugal force. Also, JP-A-2007-336737A proposes that a sleeve projected in the axial direction of the rotor can be cut by drills or other means to change weight distribution so as to improve balance.

SUMMARY

In the die-casting method, many examples are known in which aluminum or alloys of aluminum are used as materials for the end rings 2 and the conductor bars 4. However, there are very few examples of using copper or alloys of copper as the metal in order to obtain higher efficiency due to reducing resistance. Copper is less common in the die-casting process because of the difference between both melting points. The melting point of copper is approximately 1083 degree Celsius, and therefore is much higher than the melting point of aluminum, approximately 660 degree Celsius.

In addition to higher price of copper materials than aluminum materials, copper die-casting produces low yield rates due to insufficiently filled casting regions because of low temperature while melted copper is intended to flow into the casting mold flows. Reheating the casting or rapidly filling in melted copper by use of a high spec die-casting machine to overcome the above low temperature flow problem for high heat resistant copper material, or other factors, has caused high production costs for parts using high temperature copper. As a result, the cost per one unit rises extremely.

On the other hand, the above method of attaching balance weights to reduce parts and steps too has a potential to result in a heavier rotor and lead to higher cost because there are projections even though these projections are not used. Further, since the portion of the rotor with balance weights has different shape from other portions where no weights are attached, wind noise occurs while the rotor is rotating during motor operation. Therefore, provisions against noise may also be needed.

Further, the method of JP-A-H07-143709A in which putty is attached to an inner surface of a cylinder portion to improve balance has still had potential problems due to a tendency of the putty to detach. Also, that balance method requires a more complicated production method. The method of JP-A-2007-336737A in which a sleeve projected in the axial direction has been cut has also had difficulty in complicating the production method due to shapes for cutting part of the sleeve by drills or other means. Both techniques require an added component, the cylinder or sleeve projection, which increases weight and manufacturing cost.

Hence, it may be useful to provide well balanced squirrel-cage rotors for electric motors and production methods for such rotors with higher reliability of mechanical and electrical connection, easy production processes, and low cost. We will especially focus our discussion of examples on squirrel-cage rotors for electric motors. Each rotor is manufactured in such a manner that a core is composed of a plurality of thin electromagnetic steel plates. Each plate includes a core shaft hole at the center and a plurality of approximately trapezoidal core slots arranged circumferentially. The core plates are laminated to one another. End rings of shapes approximately the same as the core plates are attached at the both ends of the core, in the shaft axis direction. A rotor shaft extends through the core shaft holes of the plates and end rings. The end rings accommodate conductor bars so that the conductor bars extend through the slots of both the core plates and the end rings, and the end rings and conductor bars are bonded thereof.

Rather than add parts, e.g. a sleeve, a cylinder, a weight or even putty, amounts of material used for bonding are adjusted to improve rotor balance.

In a disclosed example implemented on a squirrel-cage rotor for an electric motor, the squirrel-cage rotor comprises a rotary-shaft, a plurality of conductor bars circumferentially arranged around the rotary-shaft, end rings including a plurality of slot portions which are attached to the conductor bars, and a plurality of mechanical and electrical connect portions produced by pressing at portions of the end rings corresponding to the plurality of conductor bars. In this example, quantities of the braze used to bond various components of the rotor differing from each other by an amount to improve balance of the rotor.

An example is also disclosed of a production method for a squirrel-cage rotor for an electric motor. The rotor comprises a shaft, a plurality of conductor bars circumferentially arranged around the rotary shaft, and end rings including a plurality of slot portions which are attached to the conductor bars. The method involves pressing at portions of the end rings of outer surfaces of the end rings corresponding to the plurality of conductor bars. Mechanical and electrical connections may be provided by applying brazing material into the portions in one or more quantities so as to modify rotary balance.

The examples may offer one or more of the following advantages. According to the examples of a squirrel-cage rotor for electric motors, by pressing the ring perpendicular to the axis of the shaft to deform the end ring, there may be higher reliability of mechanical connections. Since the balancing solution does not require adding new shapes for manufactured parts, the solution does not increase cost due to additional parts. If brazing material (silver, copper-phosphorous, or others) is applied into the deformed end ring, the outer surface of the conductor bar or spaces formed by deformation and is heated to prescribed temperature or melting point of brazing material, stable efficiency of electric motors may be provided by strengthening electrical continuity between the end ring and the conductor bars.

Further, because a step for deforming the end ring and attaching the conductor bars and a step for heating brazing material can be separated, rotary balance can be measured between the above steps. Such an approach makes it easier to improve balance because a modification step by difference of weight due to the quantity of brazing or by using balance weights and a heating brazing material step can be combined if quantity of unbalance is higher than prescribed one.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed example discussed below.

BRIEF DESCRIPTION OF THE SEVERAL VIEWS OF THE DRAWINGS

The drawing figures depict one or more implementations in accord with the present teachings, by way of example only, not by way of limitation. In the figures, like reference numerals refer to the same or similar elements.

FIG. 14A is a side view of a prior art rotor.

FIG. 14B is an end view of a prior art rotor.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Squirrel-cage rotors as discussed herein can be used for high performance electric motors that use copper conductors, electric motors required to use conductor bars whose thickness of core portion is thick compared to a diameter of core, and other electric motors.

Figure 1:
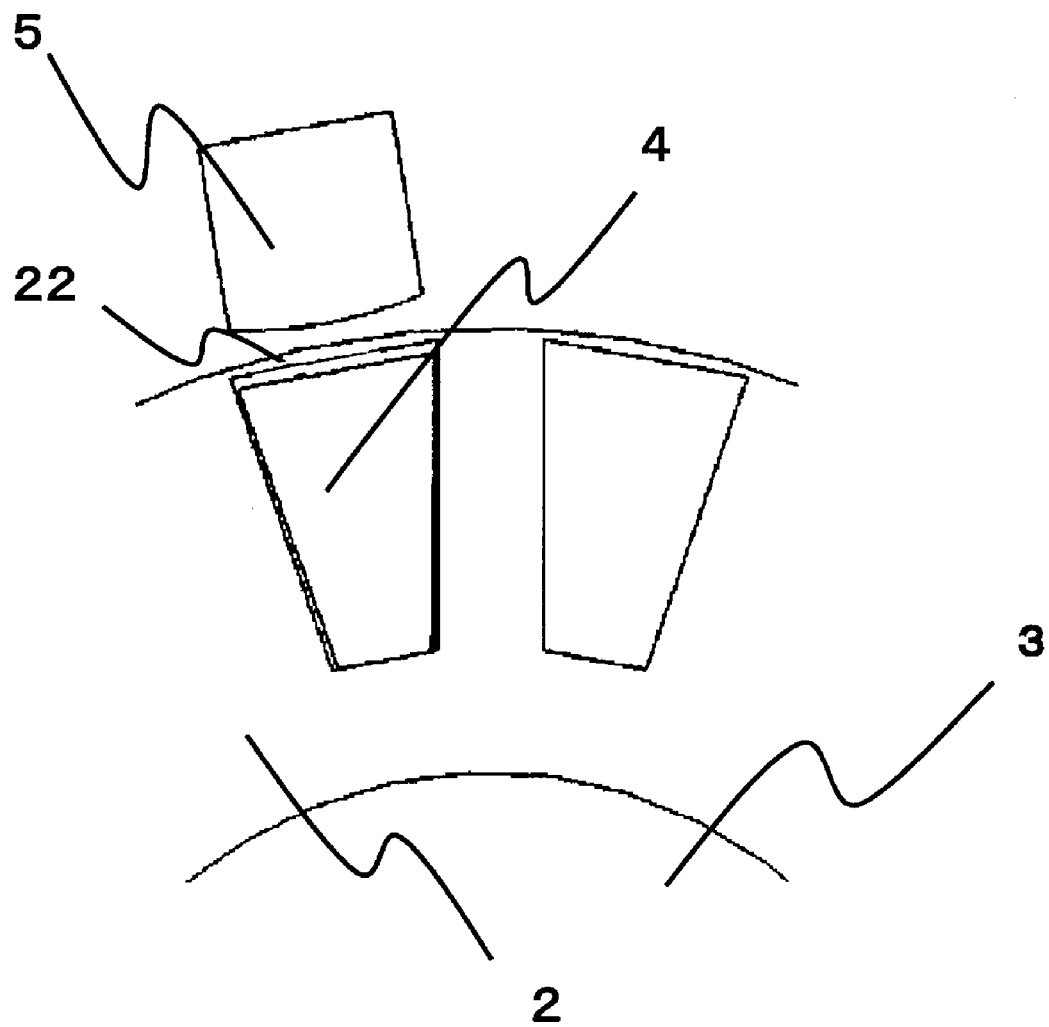
FIGS. 1 to 7 are various views of patterns of a rotor at different stages of processing according to a first exemplary method.
Figure 2:
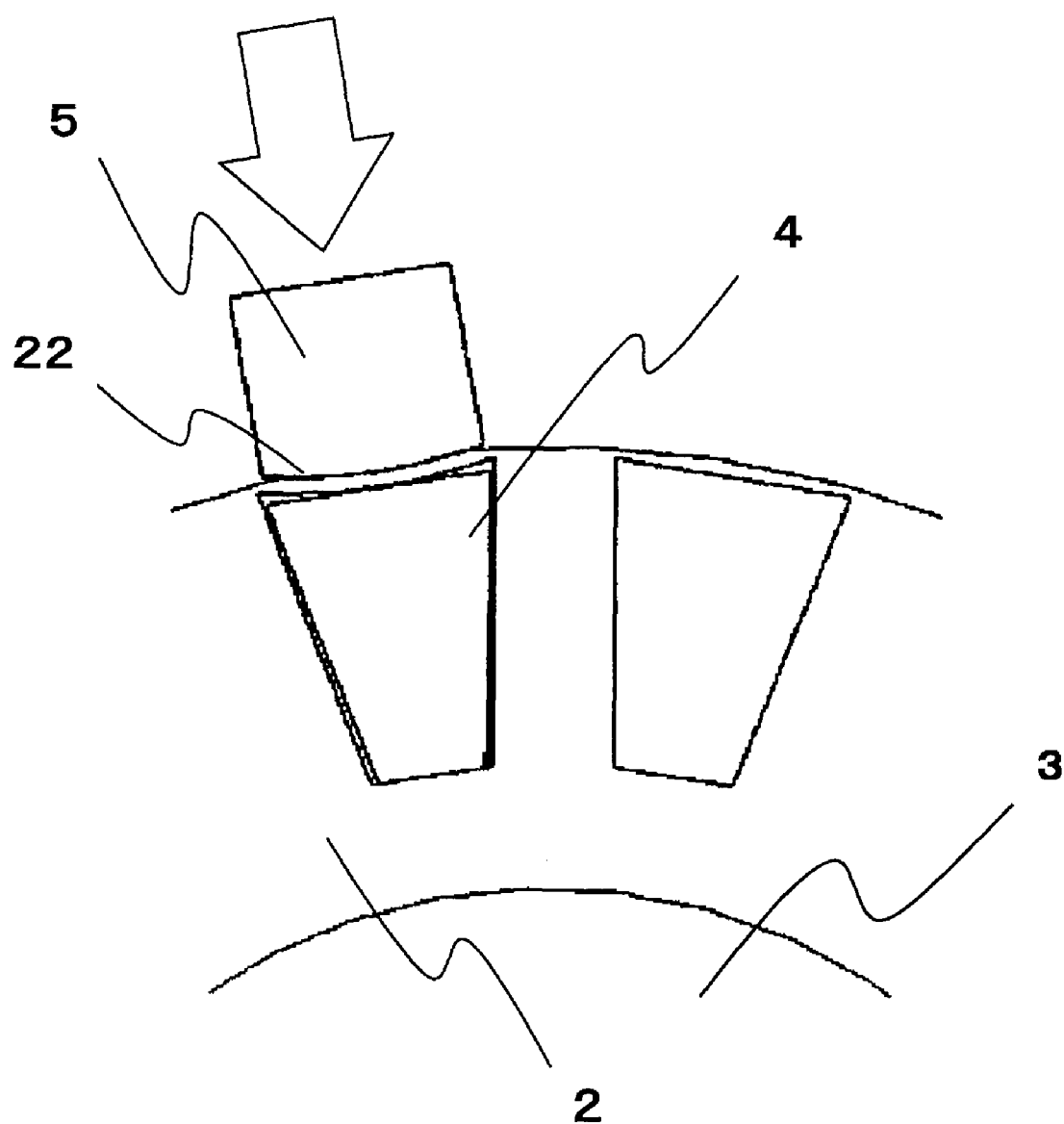

A production method according to a first example is illustrated in FIG. 1 and FIG. 2. These drawings show end facing surfaces of an end ring 2 and conductor bars 4 from a view in an axial direction of shaft 3. FIG. 1 indicates that a pressing part 5 is standing by over a position of a thin portion 22 of an outer surface of one of the end rings 2. In FIG. 1, the pressing part 5 is at a holding distance so as not to contact the periphery of the end ring 2. The end ring 2 is attached at the both axial direction sides of a core 1 (not shown here).

The end surfaces of the conductor bars 4 coincide approximately with the outer surface (away from or the opposite the core 1) of the end rings 2, in a manner similar to the arrangement shown in FIG. 14A. The width of the pressing part 5 is the same as or more than the width of the end ring 2. In the axis direction of the shaft 3, the pressing part 5 is set at the position so that the pressing part 5 does not extend so as to cross the plane of the end surface of the core 1 and thus does not contact the core 1 during pressing.

In the above locations, a mechanism (not shown) moves the pressing part 5 toward the outer surface of the end ring 2 and further moves the part 5 after contact with the ring 2 to apply pressure. By the above movement of the pressing part 5, the pressure deforms the thin portion 22 (FIG. 2) which is thin-formed due to the hole or slot for the conductor bar 4 is near the surface of the end ring 2.

Figure 3:
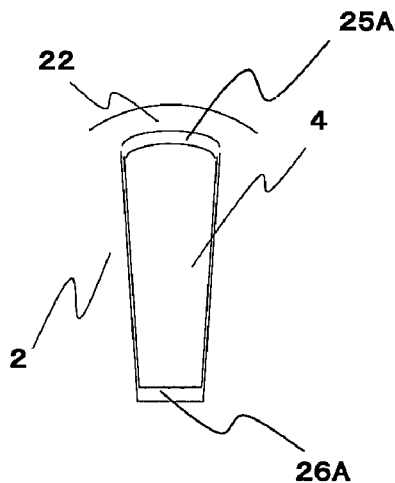
Figure 4:
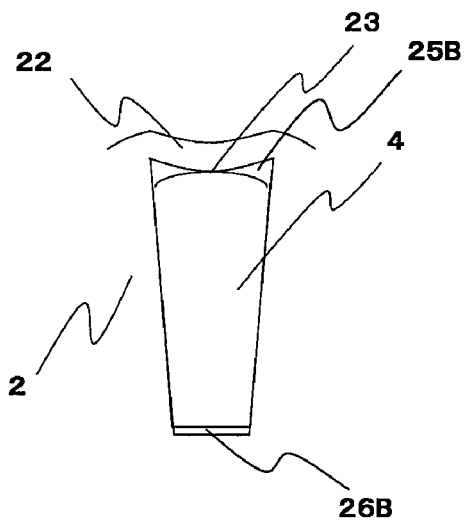

Due to this deformation, space between the thin portion 22 of the end ring 2 and the conductor bar 4 become narrow. As shown in FIGS. 3 and 4, the spaces after deforming (See 25B and 26B in FIG. 4) are narrower than the spaces before deforming (See 25A and 26A in FIG. 3). Further, after the space is diminished, the not shown mechanism for moving the pressing part continues being moved. The thin portion 22 itself or both of the thin portion 22 and the conductor bar 4 may be deformed. This deformation forms a connection between the end ring 2 and the conductor bar 4. Similar processing for the other bars 4 and slots around each of the rings 2 forms similar electrical and mechanical connections. The bar-to-ring connections can be strong and stable.

Figure 5:
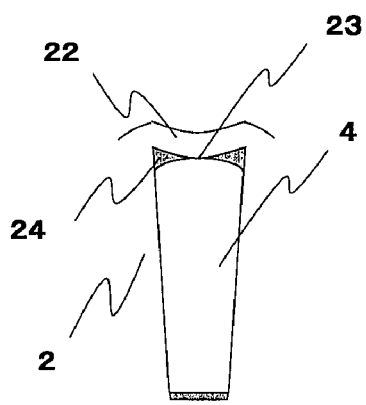

FIGS. 3, 4, and 5 are views which show the outer surfaces of the end ring 2 and the conductor bar 4 (e.g. when looking toward one end of the rotors). FIGS. 3, 4, and 5 illustrate situations respectively regarding standing by, deforming a connection 23, and injecting brazing material 24. The amount of movement or travel of the part 5 when pressed against the thin portion 22 of the end ring 2 may be a set distance or may be determined by an amount of the required pressure. As shown in FIG. 4, the end ring 2 and the conductor bars 4 contact each other at the connection 23 to provide electrical conductivity after deformation of the ring by the press.

As shown in FIG. 5, brazing material 24 (silver, copper-phosphorous, or others) is injected and heated around melting point of the brazing material, to join the surfaces of the slots of the end ring 2 and surfaces of the conductor bars 4 and fill-in the space left by the deformation. For example, a high-frequency alternating current of prescribed current value and frequency is passed through a high-frequency heating coil (Not shown here) located around the circumference of the end ring 2 in order to be heated up to the designated temperature over the melting point of the brazing material.

The processes of creating the connection by deformation, adding brazing material and melting the brazing material provide further strengthening of electrical continuity between the end ring 2 and the conductor bars 4 and stable efficiency for the rotor.

Figure 16:
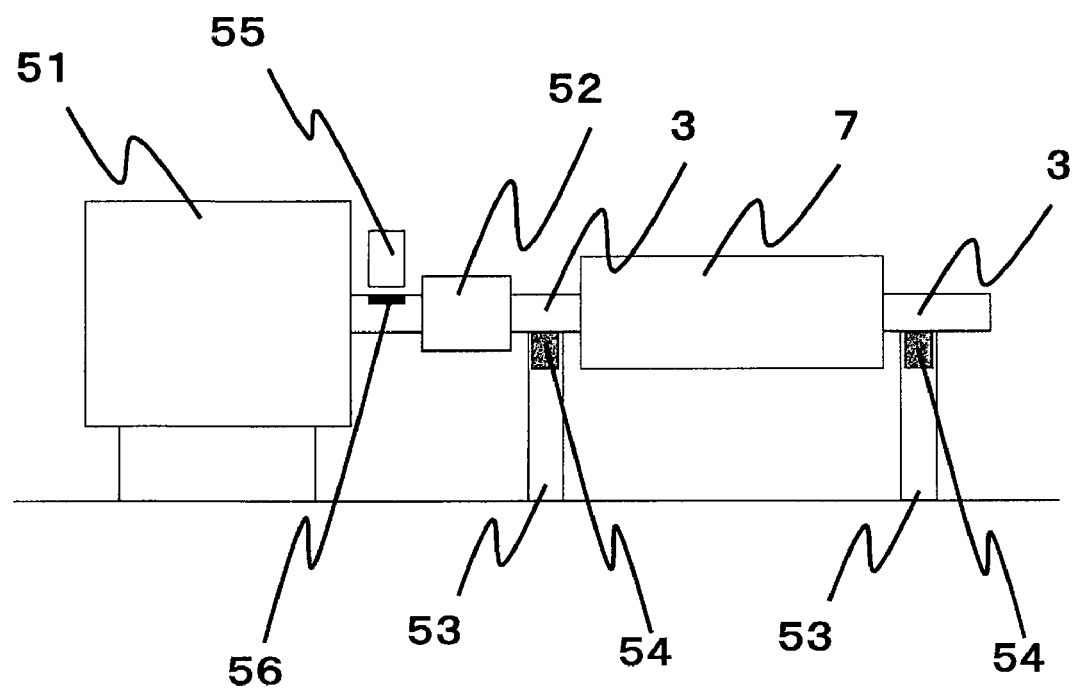
FIG. 16 illustrates an outline of a setup for measuring rotary balance.

When the deformation of the thin portion 22 of the end ring 2 is completed as shown in FIG. 4, rotary balance is measured. An outline of a setup for measuring rotary balance is illustrated in FIG. 16. Oscillation sensors 54 are attached to shaft supporters 53 supporting a shaft 3 that protrude from both sides of a rotary body 7 as a measured body. Coupling 52 is set up at one end of the shaft 3 of the rotary body 7, which connects the rotary body 7 to an electric motor 51 for rotating the measured body. The shaft has origin and/or index markings 56 relating to rotary positions of the shaft connecting the electric motor 51 and the coupling 52. The rotational relationship of the electric motor 51 and the rotary body 7 is fixed. Rotary positions of the rotor body 7 are sensed by sensing the shaft markings 56 with a sensor 55.

A measuring method will be explained. Both sides of the shaft 3 are set on the shaft supporters 53. One side of the shaft 3 is connected to the coupling 52 which connects further to the shaft of the electric motor 51. In this condition the electric motor 51 rotates, and the rotary body 7, the measured body, is synchronously rotated. The higher rotary speed becomes, the larger will be any vibration caused by centrifugal force. Therefore more accurate sensing can be enabled. Generally, the system rotates the rotor body 7 at around 1,000 rpm, 3,000 rpm or higher.

While rotating, the oscillation sensors 54 at the shaft supporters 53 sense oscillation which is being caused by imbalance of the rotary body 7. Concurrently, the rotary index sensor 55 detects marks 56. Based on rotor index and the values detected by the oscillation sensors 54, a quantity of imbalance is calculated for each angular position of the rotor. In this process, considering a value detected by one oscillation sensor 54 located near the electric motor 51 and a value detected by the other oscillation sensor 54 located opposite to the electric motor 51, skew of imbalance also can be detected. If imbalance is over a certain value designated respectively for each kind of motor product, a modification of the rotor for improving rotor balance will be conducted.

By the value or values resulting from measuring the imbalance, a judgment is made as to whether a modification for balance can be conducted by making a difference in weight in the quantities of brazing material. If so, then the quantities of brazing material at various points are controlled when applying brazing material. For example, a high-frequency alternating current of prescribed current value and frequency is passed through a high-frequency coil located around the circumstance of the end ring 2. While so heated, appropriate amounts of braze material (24 in FIG. 5) are injected and melted. The braze material cools and hardens in place after heat is removed. These brazing processes provide not only further strengthening of electrical continuity between the end ring 2 and the conductor bars 4 and stable efficiency for the rotor but also complete the modification to improve rotor balance.

Figure 6:
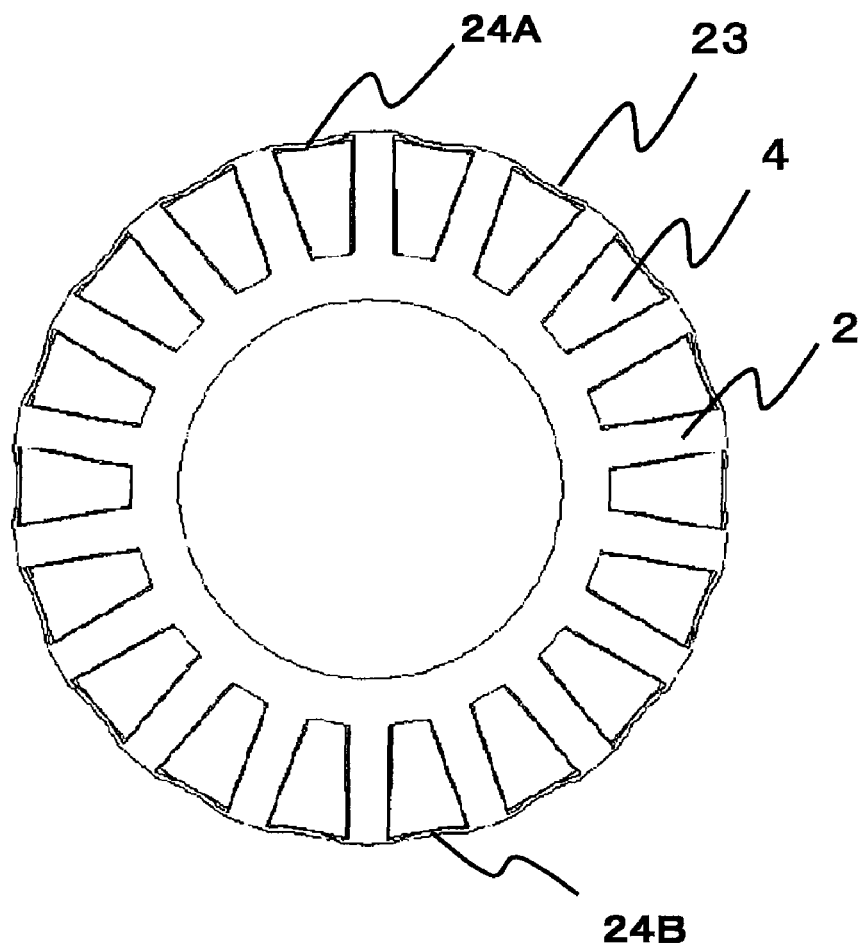
Figure 7:
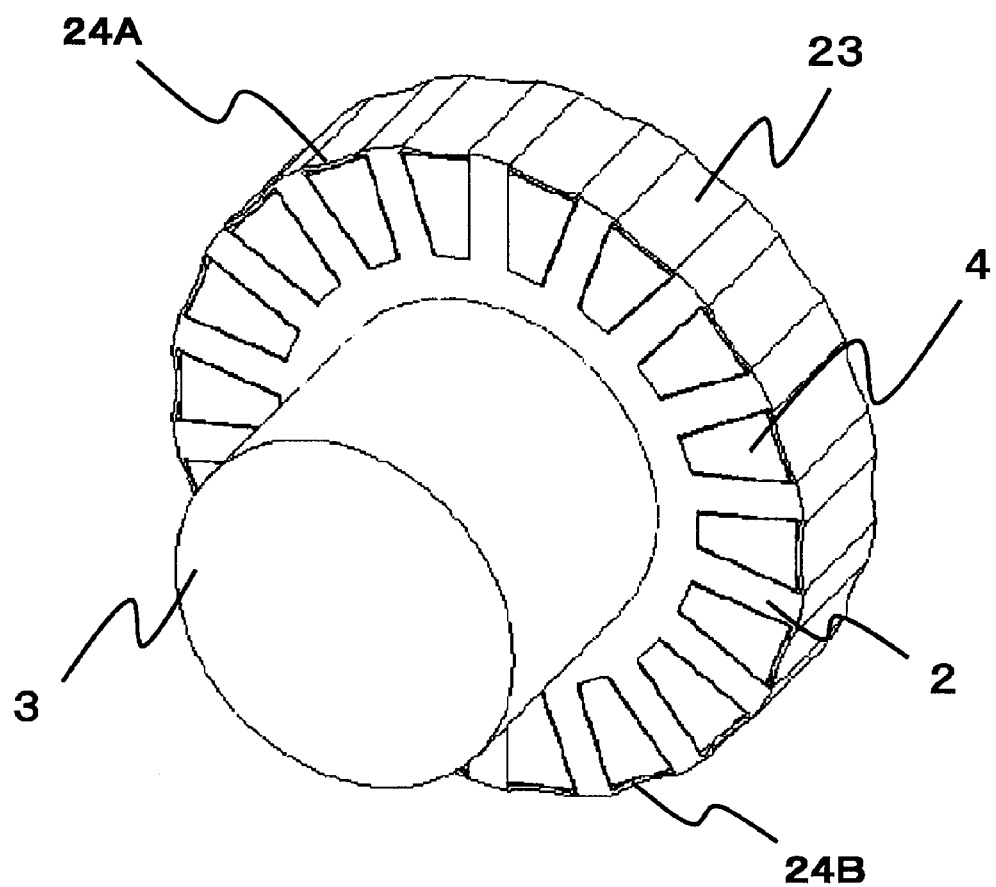

FIGS. 6 and 7 show outlines of a rotor for an electric motor according to the first example. FIG. 6 is a front view, and FIG. 7 is a perspective view. A plurality of mechanical and electrical connection portions 23 are made at portions around the end ring 2 corresponding to a plurality of conductor bars 4 by pressing and brazing.

To provide a well balanced squirrel-cage rotor for an electric motor, quantities of braze used to bond various rotor components differ from each other by an amount so as to serve as balance weight in order to improve balance. For example, brazing material is applied into the thin portions 24 in one or more quantities to modify rotor balance. In FIGS. 6 and 7, axially symmetrical quantities of the braze at opposite locations across the axis of the rotor differ from each other. For example, the quantity of the braze at 24A is different from the quantity of the braze at 24B. In this way, the weight difference improves balance of the rotor.

Figure 8:
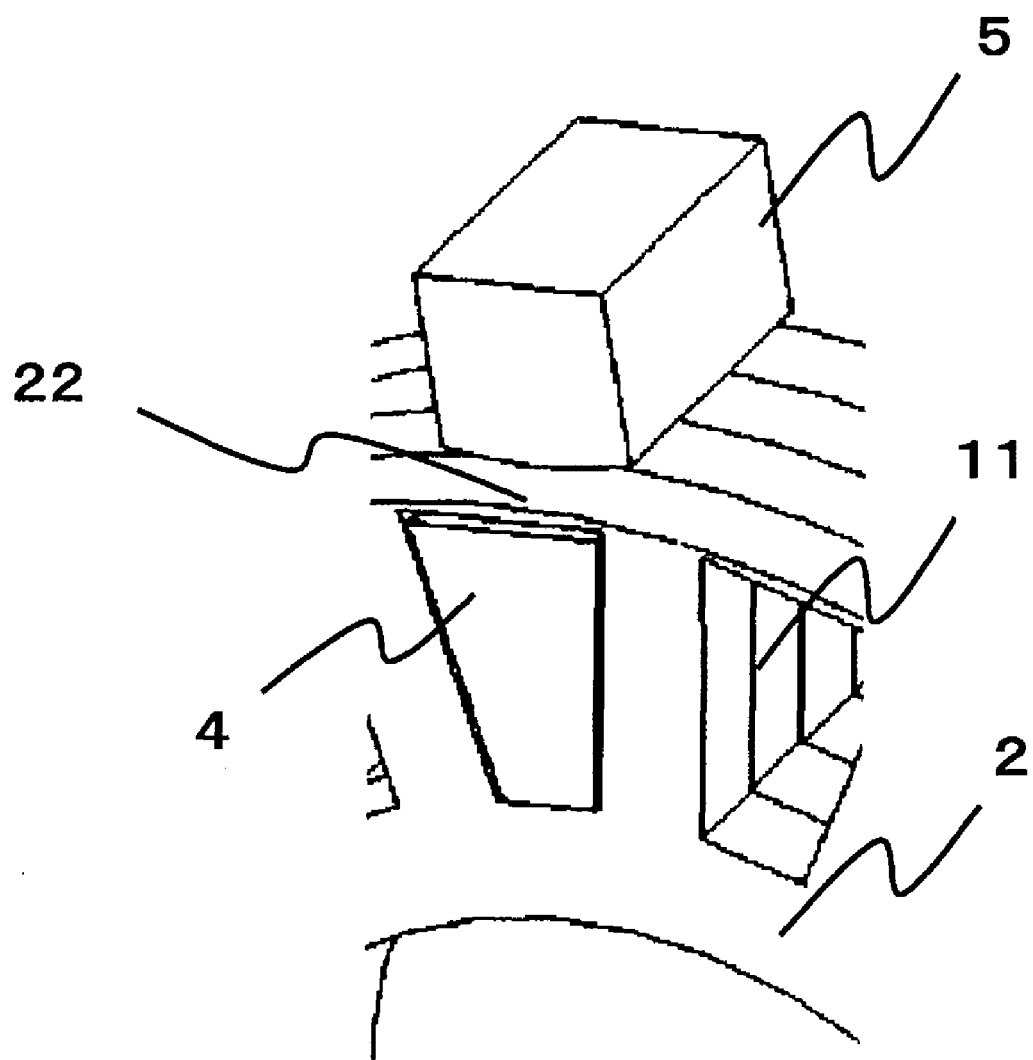
FIG. 8 is a view of a rotor at pressing according to a second exemplary method.
Figure 9:
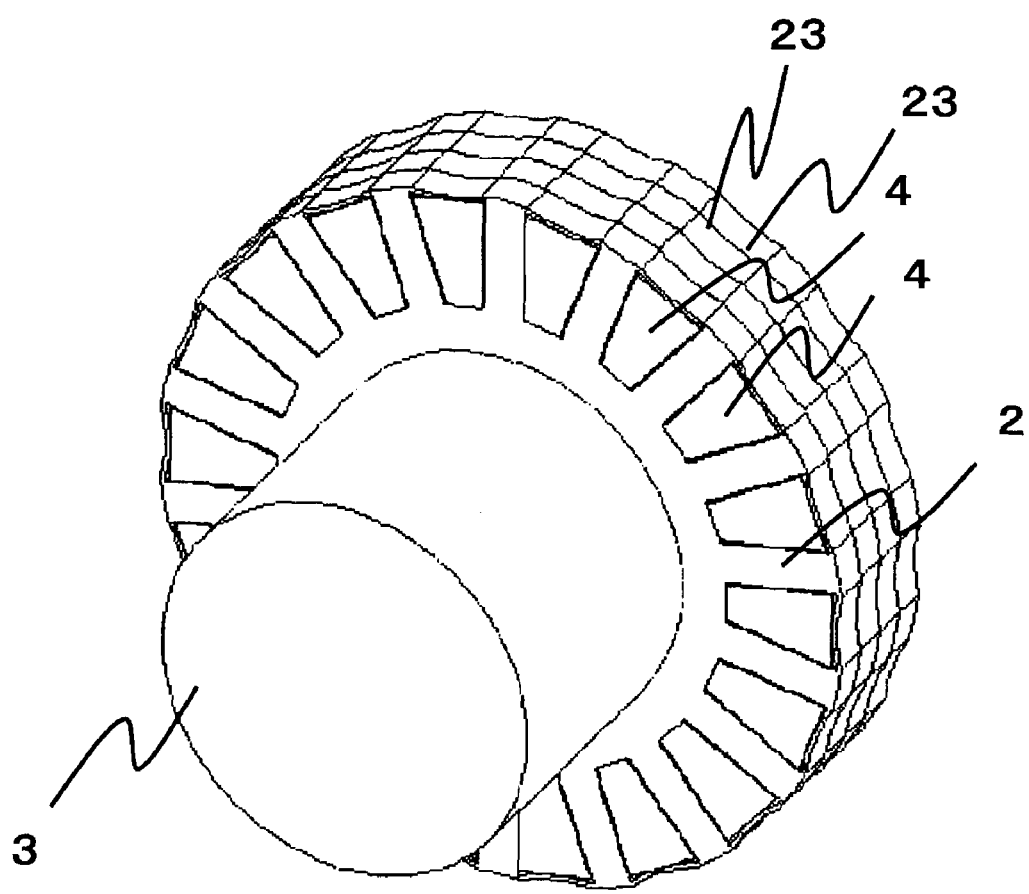
FIG. 9 is a perspective view of a second example of a rotor.

A second example of a rotor for an electric motor is shown in FIGS. 8 and 9. These drawings show an example in which one of the end rings 2 is composed of thin plates laminated to one another in the axial direction of the rotary-shaft. The cost may rise due to the thickness of the end ring 2 because machining like milling or wirecutting is needed to remove excess raw materials.

Except possibly for thickness, the shape of the thin plates is fixed. The plates are manufactured to design specifications, and these thin plates are laminated to one another to provide the specific total thickness for the rotor and plate. FIG. 8 discloses this structure. According to this method, since pressing can be used to manufacture thin plates as parts of end rings 2, the cost for parts can be lower. The thickness of the pressing device 5 is approximately the same as or more than the thickness of the end ring 2. Therefore, the ability to deform the thin portion 22 of the end rings 2 is maintained even though the end rings 2 are composed of laminated thin plates.

The pressing step is similar to the first example. The edge surfaces of the conductor bars 4 are set to correspond approximately to the surfaces which does not contact the core 1 of the end rings 2 which is attached at both of sides of the core 1 which is not shown here in the axial direction. The width of the pressing 5 is the same as or more than the width of the end ring 2 formed by the thin plates. The pressing part 5 is, in the axis direction of the shaft 3, set at the position where the pressing part 5 does not contact or cross the extension plane of the end surface of the core 1.

In the above locations, by a mechanisms for moving the pressing which is not shown in FIGs, the pressing part 5 is moved toward the outer surface of the end ring 2 and further moved after their mutual contact. By the above movement of the pressing 5, the thin portion 22 which is thin-formed due to a hole for the conductor bar 4 to penetrate is deformed near the surface of the end ring 2.

Due to this deformation, space between the thin portion 22 of the end ring 2 and the conductor bar 4 become narrow (FIG. 5). Further, after the space is diminished, the not shown mechanism for moving the pressing part continues being moved. The thin portion 22 itself or both of the thin portion 22 and the conductor bar 4 may be deformed. This deformation forms a connection between the end ring 2 and the conductor bar 4. Similar processing for the other bars 4 and slots around each of the rings 2 forms similar electrical and mechanical connections. The bar-to-ring connections can be strong and stable. Under this condition, electrical conductivity between the end rings 2 and the conductor bars 4 has been provided.

As shown in FIG. 9, the mechanical and electrical connections at 23 is made by pressing a plurality of corresponding positions of outer surfaces of the end rings 2 composed of the laminated thin plates against a plurality of the conductor bars 4.

When the deformation of the thin portion 22 of the end ring 2 is completed, rotary balance is measured (see the previous explanation). By the value or values resulting from measuring the imbalance, a judgment is made as to whether a modification for balance can be conducted by making a difference in weight in the quantities of brazing material. If so, then the quantities of brazing material added at various points are controlled when applying brazing material instead of attaching balance weights. In this example, brazing material is heated up to the designated temperature over the melting point of the brazing material. While so heated, appropriate amounts of braze material are injected and melted, in a manner similar to the reference number 24 of the other example as shown in FIG. 5. The braze material cools and hardens in place after heat is removed. These brazing processes provide further strengthening of electrical continuity between the end ring 2 and the conductor bars 4 and stable efficiency for the rotor. By selecting the quantities of braze material, the process also corrects or reduces any measured imbalance.

Figure 10:
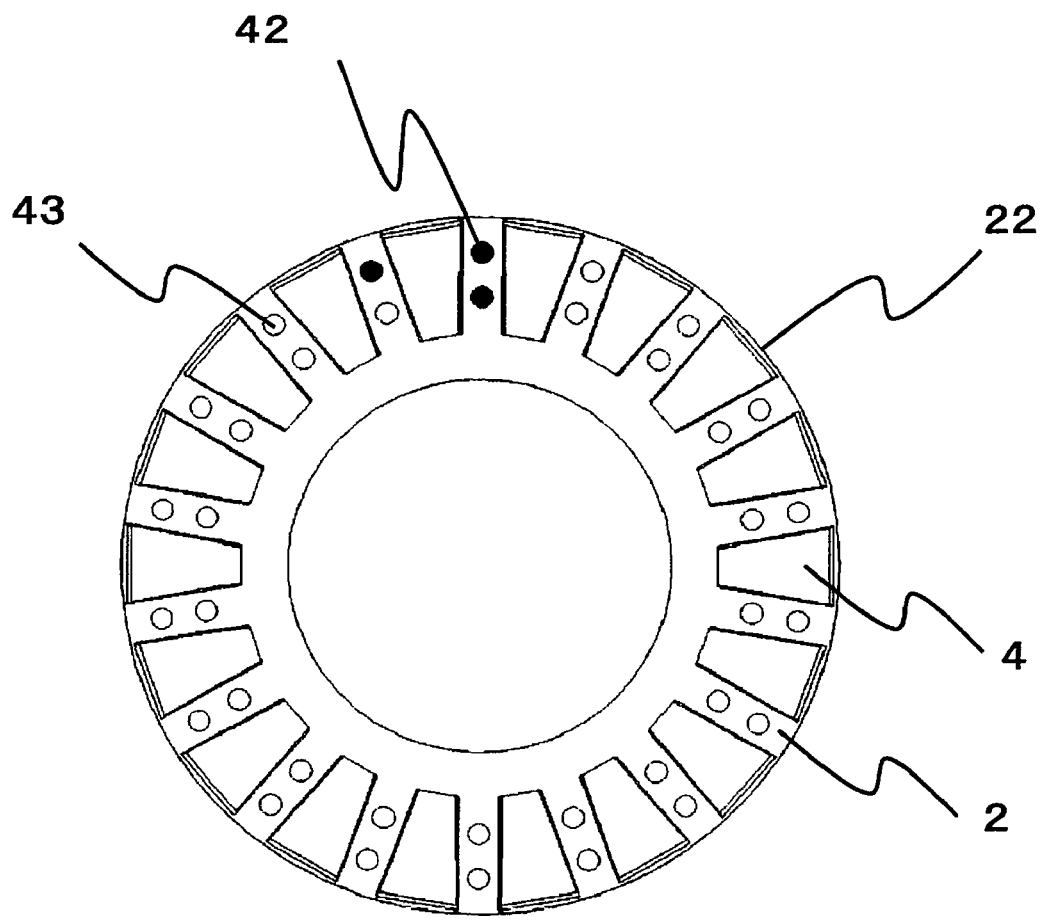
FIG. 10 is a front view of a third example of a rotor.
Figure 11:
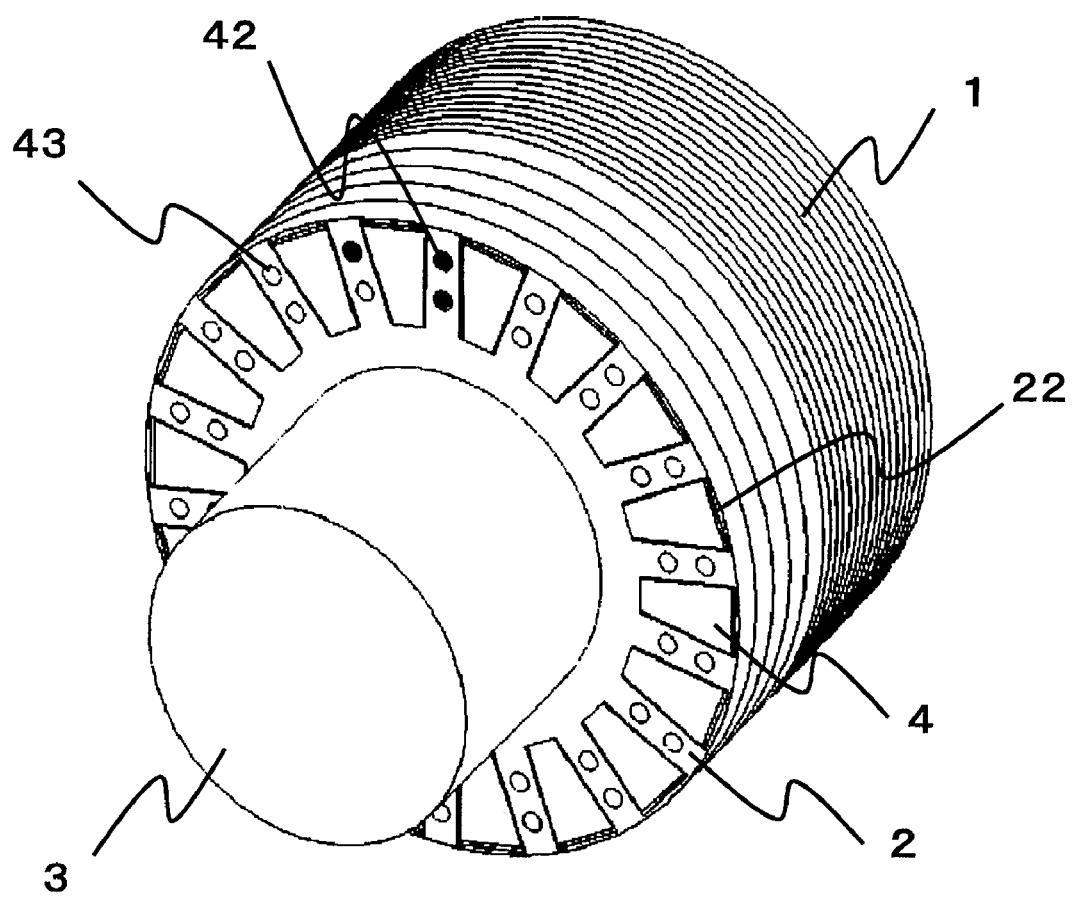
FIG. 11 is a perspective view of a third example of a rotor.
Figure 18:
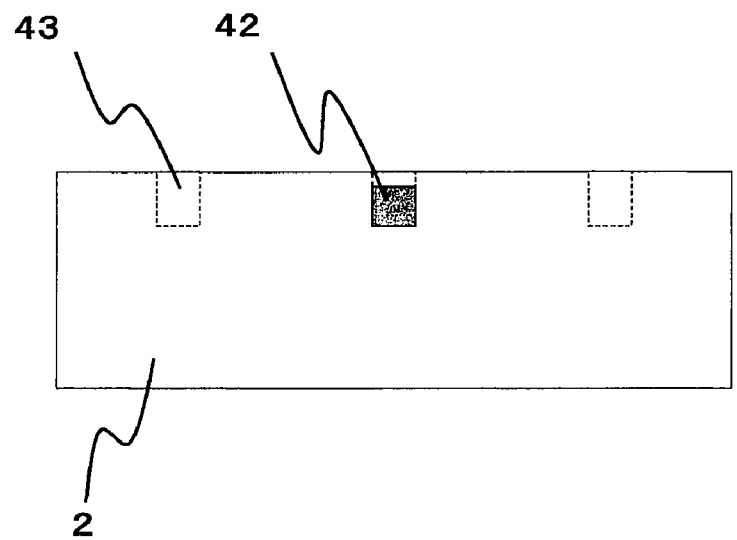
FIGS. 18 to 21 are various views of examples of the depth of balance weight holes and quantities of brazing material.
Figure 19:
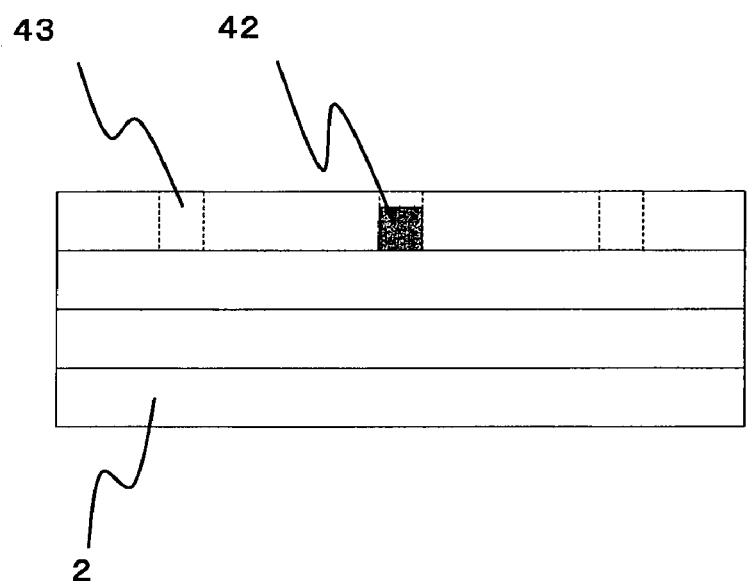

A third example of a rotor for an electric motor is shown in FIGS. 10 and 11. FIG. 10 is a front view, and FIG. 11 is a perspective view. This rotor may be initially or partially balanced in essentially the same manner as in the examples discussed above regarding FIGS. 1-9 and 16. In addition, this example discloses a rotor having a plurality of balance-weight-holes 43 circumferentially provided and arranged along two different circumferences of the end rings 2. In this structure, the diameters of balance-weight-holes 43 arranged in approximately the same circumference are the same as each other. In a case where the end ring 2 is made of one material or plate like the first example, the depth of the balance-weight-hole 43 is the same as or more than the length of the balance weight 42 as shown in FIG. 18.

In a case where the end ring 2 is composed of a plurality of thin plates laminated to one another in the axial direction of the rotary shaft like the second example, it is possible that a plurality of balance-weight-holes are provided at only the closest plate to the end of the rotary shaft and no balance-weight-holes are provided at the other plates (approaching the core 1).

Figure 20:
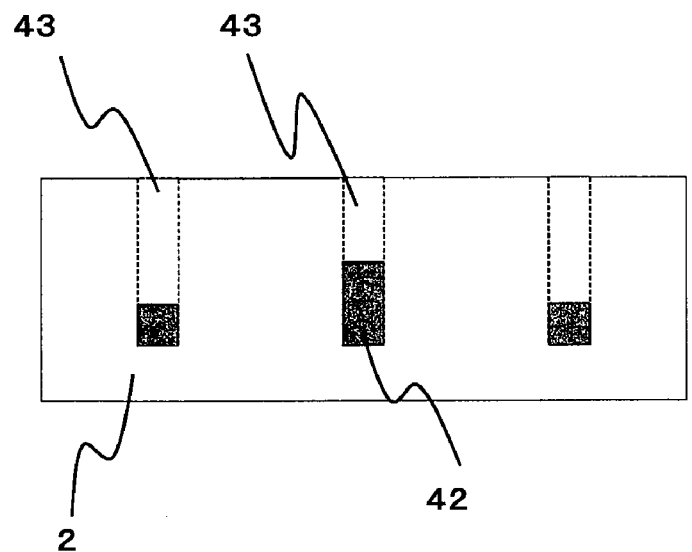
Figure 21:
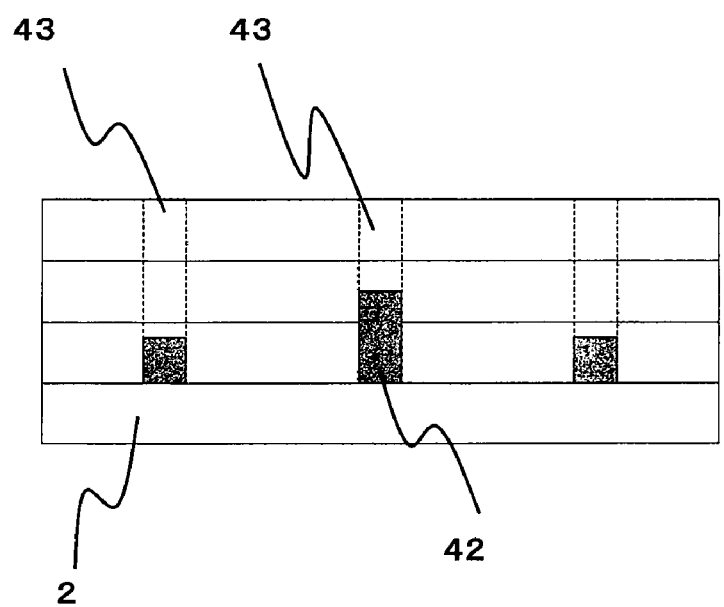

However, the depth of the balance-weight-holes need not be limited as in the specific example. For example, the depth of the balance-weight-holes 43 may be greater than the length of the balance weights 42 as shown in FIG. 20 which shows the holes at the end ring 2 made of one material (single plate type end ring). However, it is possible to apply this type balance structure to a laminated multi-plate type end ring as shown in FIG. 21. A plurality of balance-weight-holes can be provided at the closest two or more plates adjacent the end of the rotary shaft and no holes at the rest plate(s) as shown in FIG. 21.

Also, the quantities of brazing material do not have to be the same as each other in different balance-weight-holes. Considering the required modification, the needed quantities of brazing material injected into each balance-weight-hole 43 can be controlled as shown by way of example in FIGS. 20 and 21.

Pressing step is similar to the above discussed examples. The end surfaces of the conductor bars 4 coincide approximately with the outer surface (away from or the opposite the core 1) of the end rings 2, in a manner similar to the arrangement shown in FIG. 14A. The width of the pressing part 5 is the same as or more than the width of the end ring 2. In the axis direction of the shaft 3, the pressing part 5 set at the position so that the pressing part 5 does not extend so as to cross the plane of the end surface of the core 1 and thus does not contact the core 1 during pressing.

In the above locations, a mechanism (not shown) moves the pressing part 5 toward the outer surface of the end ring 2 and further moves the part 5 after contact with the ring 2 to apply pressure. By the above movement of the pressing part 5, the pressure deforms the thin portion 22 which is thin-formed due to the hole or slot for the conductor bar 4 is near the surface of the end ring 2.

Due to this deformation, space between the thin portion 22 of the end ring 2 and the conductor bar 4 become narrow (FIG. 5). Further, after the space is diminished, the not shown mechanism for moving the pressing part continues being moved. The thin portion 22 itself or both of the thin portion 22 and the conductor bar 4 may be deformed. This deformation forms a connection between the end ring 2 and the conductor bar 4. Similar processing for the other bars 4 and slots around each of the rings 2 forms similar electrical and mechanical connections. The bar-to-ring connections can be strong and stable. Under this condition, electrical conductivity between the end rings 2 and the conductor bars 4 has been provided.

When the deformation of the thin portion 22 of the end ring 2 is completed, rotary balance is measured (see the previous explanation). By the value or values resulting from measuring the imbalance, a judgment is made as to whether a modification for balance can be conducted with only setting of quantities of brazing material 24A, 24B at the connections. In some cases, however, it will also be necessary to use one or a plurality of balance weights. If so, then the quantities of brazing material injected into the balance-weight-holes 43 at various points are controlled when applying brazing material considering rotary positions instead of attaching balance weights.

If it is judged that one or a plurality of balance weights are needed, the balance weight(s) 42 are set into the required balance-weight-hole(s) 43 and brazing material is applied to the space between the end ring 2 and the conductor bars 4 and to the balance-weight-holes 43 in order to fix them.

In all cases, after applying the brazing material at various locations, brazing material is heated up to the designated temperature over the melting point of brazing material. These processes provide further strengthening of electrical continuity between the end ring 2 and the conductor bars 4 and stable efficiency for the rotor.

In this example, part of holes for balance weights can be used for applying brazing material and this brazing material works as a balance weight as well as the brazing at the connection in the above examples.

Figure 17:
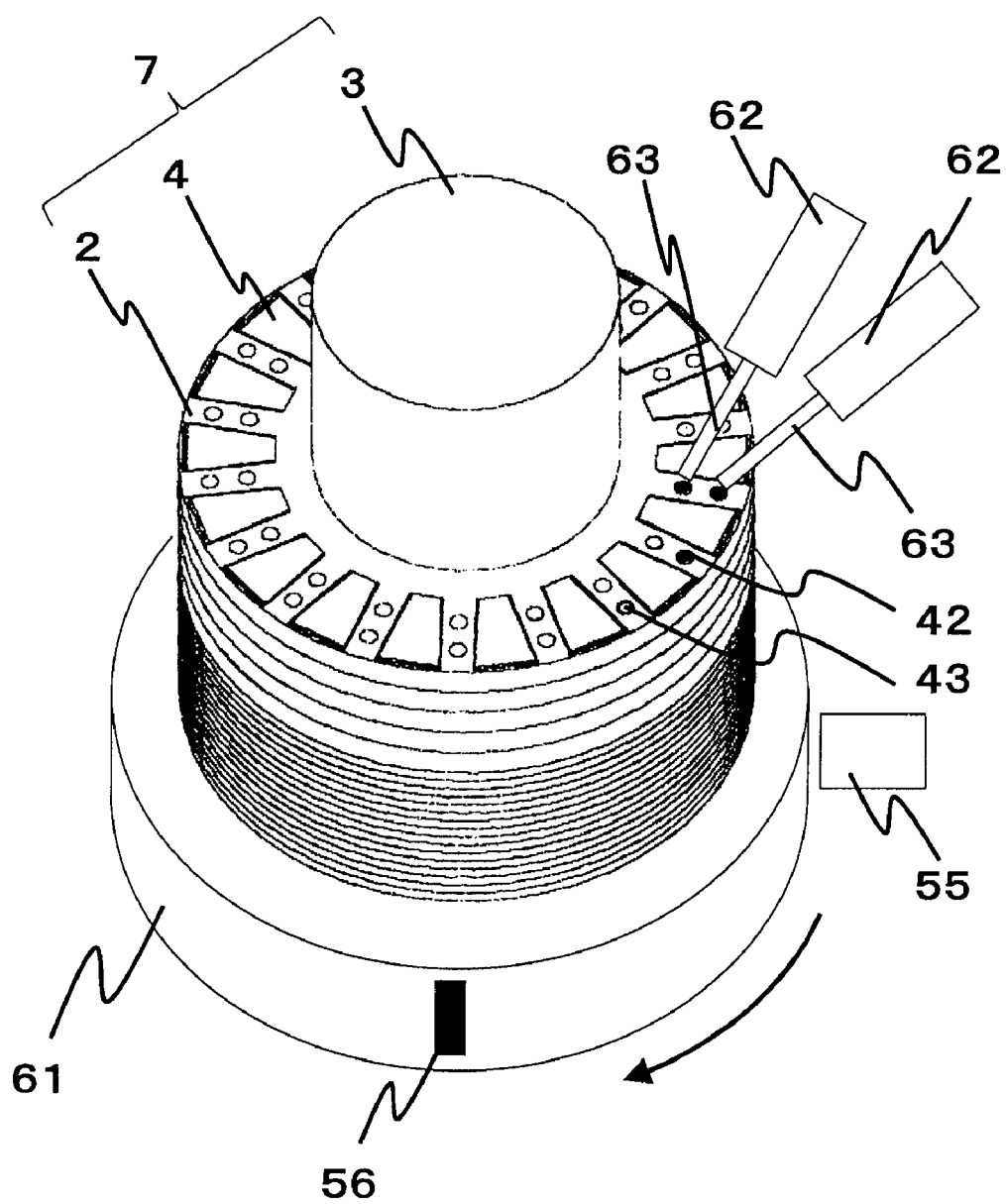
FIG. 17 illustrates an apparatus for applying brazing material.

An example of an apparatus for applying brazing material controlled based on rotary positions is shown in FIG. 17. A supporter 61 for a rotor is for holding and setting position of the rotary body 7. As in the earlier examples, the rotary body 7 includes a core, end rings 2, a rotary shaft 3 and conductor bars 4. The supporter 61 includes a rotary mechanism (not shown) in order to rotate the rotary body 7 on its the center axis. This supporter 61 has one or a plurality of index marking (s) 56. Rotary positions or the index position of the supporter 61 and thus of the rotary body 7 on the supporter 61 are sensed by sensing the index marking(s) 56 with the sensor 55.

A nozzle 63 for applying brazing material is located approximately over the balance-weight-hole 43 of the end ring 2 of the rotary body 7, and the nozzle 63 is connected to a syringe 62 to provide brazing material. In this example, there are two sets of syringes 62 and nozzles 63 for applying brazing material in holes 43 at two different circumferences on the end ring 2 (see also FIGS. 10 and 11) although this arrangement could be used to apply brazing material in holes in the conductor bars 4 (see FIGS. 12 and 13). Other numbers of syringes and nozzles could be used, e.g. for rotors with balance-weight-holes 43 on fewer or more circumferences on the end ring 2 and/or the conductor bars 4.

A pressure part (not shown), for example, using compressed air, applies pressure to the syringe 62 so that the nozzle 63 expels brazing material. This arrangement may be used to apply brazing material into spaces between the end ring 2 and the conductor bars 4. In the positions shown in the illustrated example, the arrangement is further used to apply brazing material to the balance-weight-holes 43. Since the quantities of brazing material needed by each rotary position to improve balance are already calculated by the setup for measuring rotary balance (shown in FIG. 16) in the previous step, required quantity of brazing material is applied into each space between the end rings 2 and the conductor bars 4 and into one or more of the balance-weight-holes 43, while revolving the rotary body 7 and considering quantities the each of the points requires. Through this step, the order of applying brazing material in the various spaces and/or holes is not restricted. For example, a controller or operator may select either order, applying controlled quantities of brazing material into spaces between the end ring 2 and the conductor bars 4 and then the balance-weight-holes 43 alternately under one rotation. Alternatively, the controller or operator may opt to apply brazing material into the balance-weight-holes 43 and then apply the material into the spaces between the end ring 2 and the conductor bars 4, e.g. as separately controlled steps during two or more than two rotations.

Those skilled in the art will appreciate that other systems can be used instead of the apparatus shown in FIG. 17 which has two pairs of applying parts including respectively the syringe 62 and the nozzle 63 corresponding to the circumferential locations of the balance-weight-holes 43. For example, one pair of syringe and nozzle can be used to reduce the cost of equipment if another mechanism moves this one set of applying parts in the radial direction of the rotary body 7 to the positions of the various spaces and holes.

Although examples of applying brazing material 24A, 24B at the connections and applying material to the balance-weight-holes 43 to form the balance weight 42, are explained separately and respectively, these methods may be used together depending on the quantities of material needed to improve rotary balance.

Figure 12:
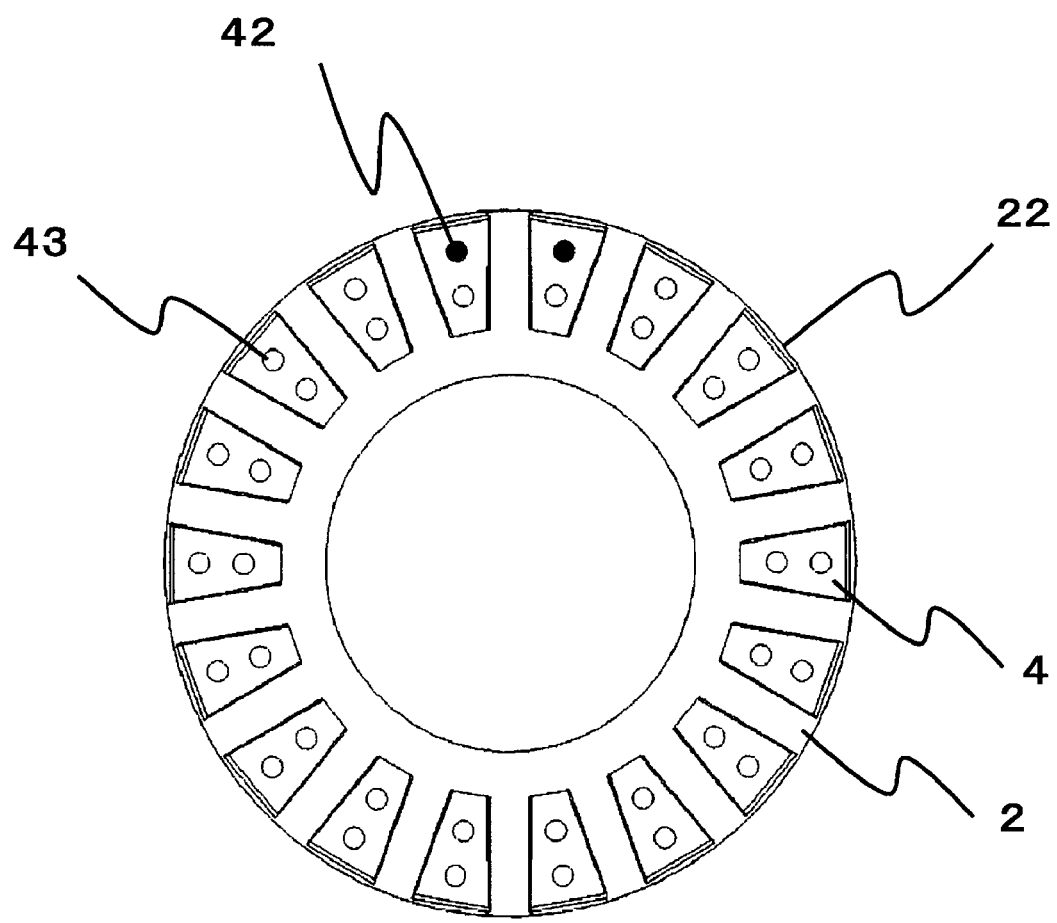
FIG. 12 is a front view of a fourth example of a rotor.
Figure 13:
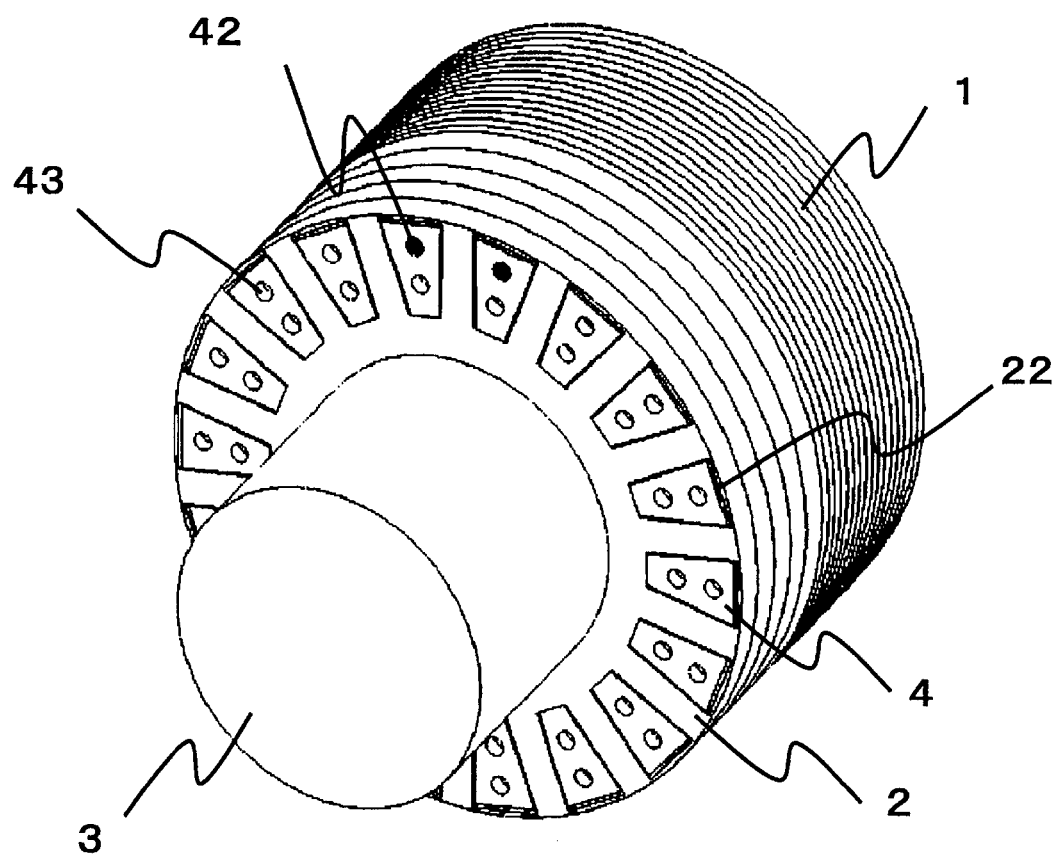
FIG. 13 is a perspective view of a fourth example of a rotor.
Figure 15:
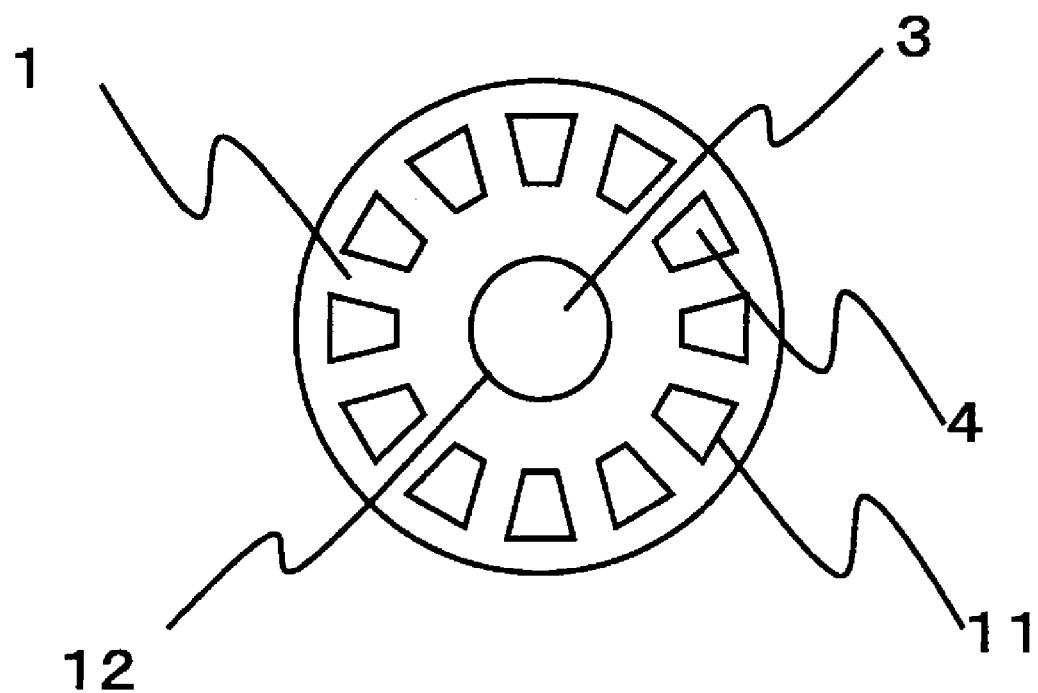
FIG. 15 is s section view at line A-A of the prior art rotor shown in FIG. 14A.

Another example of a squirrel-cage rotor for an electric motor is shown in FIGS. 12 and 13. FIG. 12 is a front view, and FIG. 13 is a perspective view. In this example, the conductor bars 4 have a plurality of balance-weight-holes 43 circumferentially provided and arranged along two different circumference after the conductor bars 4 are set in the end ring 2. The balance-weight-holes 43 are provided at the surfaces of the conductor bars 4.

Pressing step is similar to the above discussed examples. The end surfaces of the conductor bars 4 coincide approximately with the outer surface (away from or the opposite the core 1) of the end rings 2, in a manner similar to the arrangement shown in FIG. 14A. The width of the pressing part 5 is the same as or more than the width of the end ring 2. In the axis direction of the shaft 3, the pressing part 5 is set at the position so that the pressing part 5 does not extend so as to cross the plane of the end surface of the core 1 and thus does not contact the core 1 during pressing.

In the above locations, a mechanism (not shown) moves the pressing part 5 toward the outer surface of the end ring 2 and further moves the part 5 after contact with the ring 2 to apply pressure. By the above movement of the pressing part 5, the pressure deforms the thin portion 22 which is thin-formed due to the hole or slot for the conductor bar 4 is near the surface of the end ring 2.

Due to this deformation, space between the thin portion 22 of the end ring 2 and the conductor bar 4 become narrow (FIG. 5). Further, after the space is diminished, the not shown mechanism for moving the pressing part continues being moved. The thin portion 22 itself or both of the thin portion 22 and the conductor bar 4 may be deformed. This deformation forms a connection between the end ring 2 and the conductor bar 4. Similar processing for the other bars 4 and slots around each of the rings 2 forms similar electrical and mechanical connections. The bar-to-ring connections can be strong and stable. Under this condition, electrical conductivity between the end rings 2 and the conductor bars 4 has been provided.

When the deformation of the thin portion 22 of the end ring 2 is completed, rotary balance is measured (see the previous explanation). By the value or values resulting from measuring the imbalance, a judgment is made as to whether a modification for balance can be conducted without one or a plurality of balance weight by making a difference in weight in the quantities of brazing material. If so, then the quantities of brazing material added into the balance-weight-holes 43 at various points are controlled when applying brazing material considering rotary positions instead of attaching balance weights. If it is judged that one or a plurality of balance weights are needed, the balance weight (s) 42 are set into the required balance-weight-hole(s) 43 and brazing material is applied to the space between the end ring 2 and the conductor bars 4 in order to fix them and to the balance-weight-holes 43 in order to fix the balance weight (s) and the conductor bars 4. In this condition, brazing material is heated up to the designated temperature over the melting point of brazing material. These processes provide further strengthening of electrical continuity between the end ring 2 and the conductor bars 4 and stable efficiency for the rotor.

In this example, part of holes for balance weights can be used for applying brazing material and this brazing material works as balance weight as well as the above examples.

Although examples of applying brazing material 24A, 24B at the connections and applying material to the balance-weight-holes 43 to form the balance weight 42, are explained separately and respectively, these methods may be used together depending on the quantities of material needed to improve rotary balance.

Figure 22:
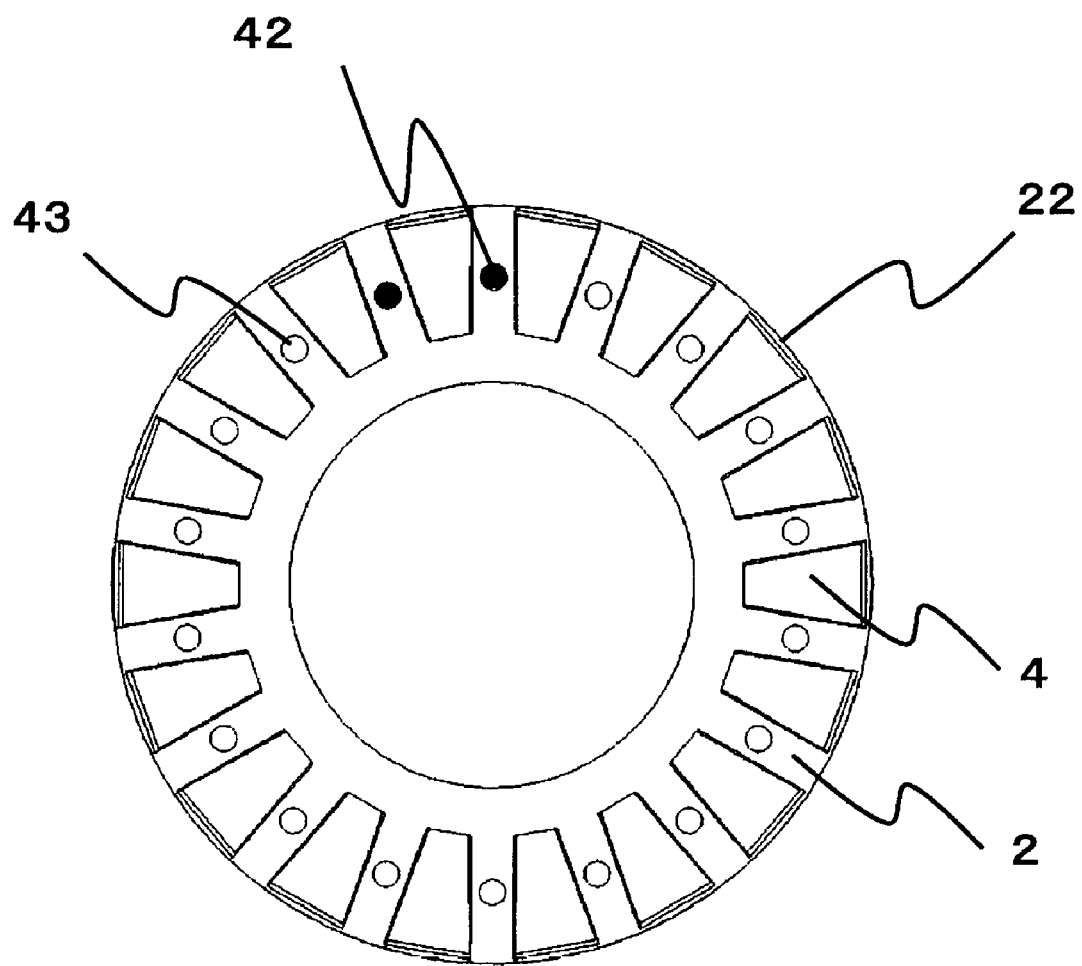
FIGS. 22 to 24 illustrate other alternative examples of rotors.
Figure 23:
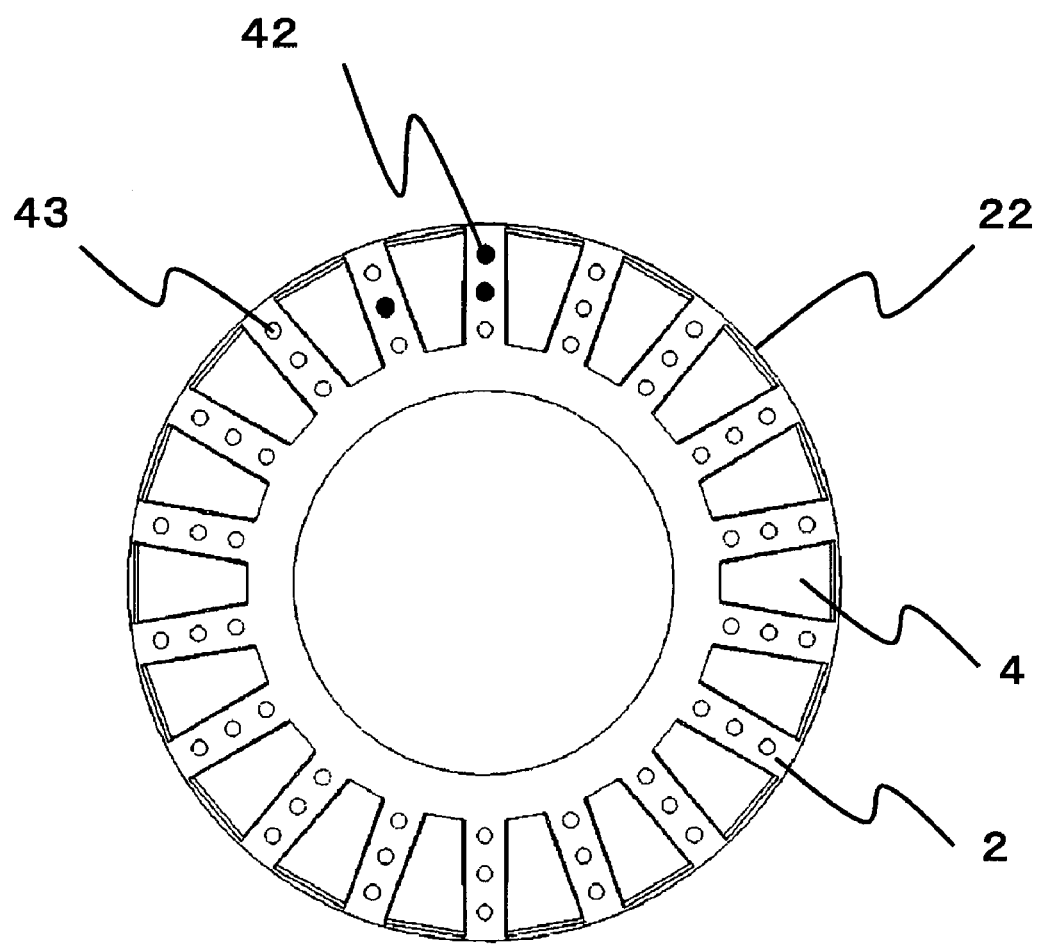
Figure 24:
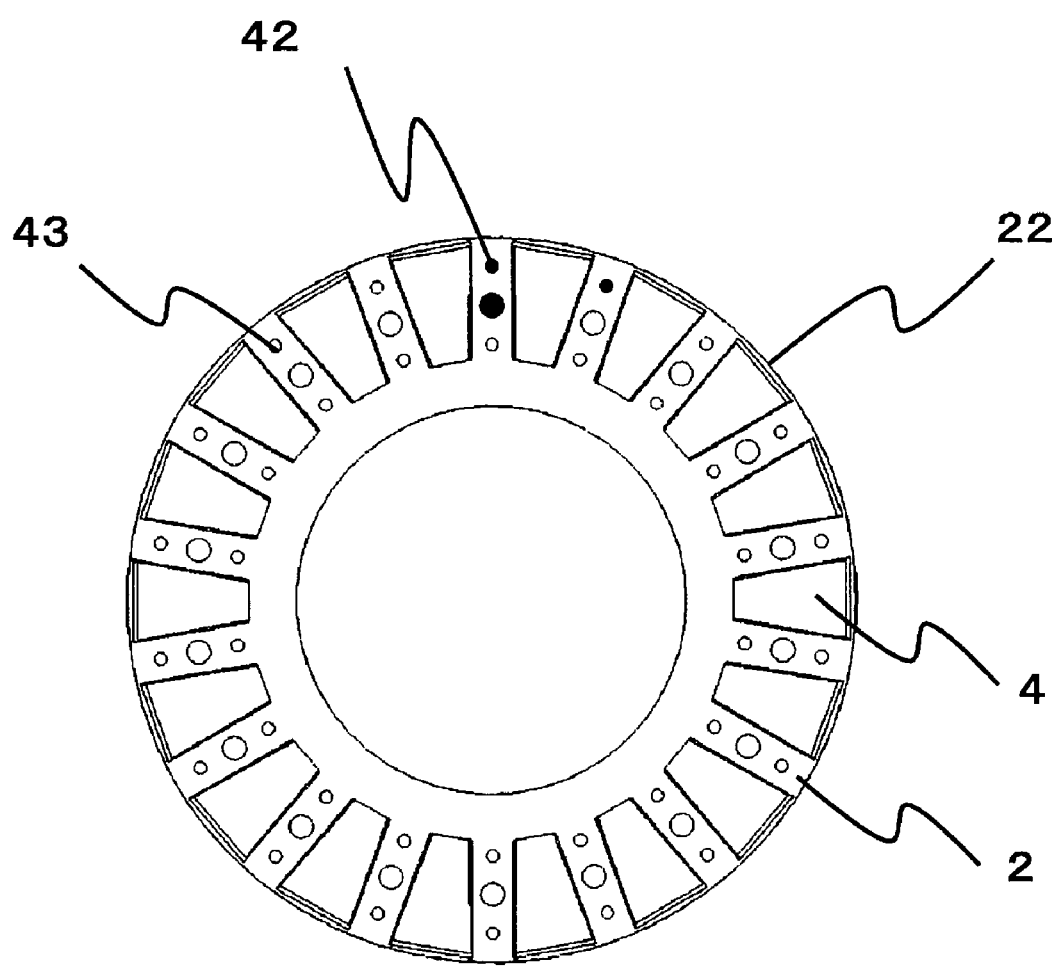

A few other alternative examples of squirrel-cage rotors for electric motors are shown in FIGS. 22, 23 and 24. In the example shown in FIG. 22, a rotor has a plurality of balance-weight-holes 43 circumferentially provided and arranged along one circumference of the end ring 2. In this structure, the diameters of balance-weight-holes 43 arranged in approximately the same circumference are the same as each other although the diameters could vary. FIG. 23 discloses an example of a rotor having a plurality of balance-weight-holes 43 circumferentially provided and arranged along three different circumferences on the end ring 2. In this structure, the diameters of all balance-weight-holes 43 are the same as each other. The example shown in FIG. 24 provides a rotor with a plurality of balance-weight-holes 43 circumferentially arranged along three different circumferences on the end ring 2. In this structure, the diameters of all balance-weight-holes 43 are not the same as each other. In the example, the diameters of balance weights 42 arranged in approximately the same circumference are the same as each other, but the diameters of balance-weight-holes 43 arranged in the different circumference are different from each other.

Although FIGS. 22-24 show the balance weight holes in the spokes of end ring between the slots for bars, similar arrangements of holes for braze material type balance weights may be provided in the ends of the conductor bars. It would also be possible to provide holes and weights in various combinations of locations on the ring 2 and in the ends of the conductor bars 4. The drawings have shown the balance processing for one end of a rotor. Similar processing may be applied to the opposite end of the rotor, although the arrangement of holes and weights may or may not be the same.

Any case is allowable if processing accuracy of balance-weights-holes 43 or possible diameters to make at the designated location corresponding to required quantity or accuracy are considered.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A squirrel-cage rotor for an electric motor comprising:
a rotary shaft;
a plurality of conductor bars circumferentially arranged around the rotary shaft;
end rings including a plurality of slot portions for attachment to the conductor bars;
a plurality of mechanical and electrical connect portions produced by pressing at portions of the end rings corresponding to the plurality of conductor bars; and
quantities of the braze used to bond various components of the rotor differing from each other by an amount to improve balance of the rotor.

2. The squirrel-cage rotor according to claim 1, wherein the end rings are composed of thin plates laminated one to another.

3. The squirrel-cage rotor according to claim 2, wherein:
a plurality of holes are circumferentially provided on at least one thin plate that forms a surface of one of the end rings, and
the rotor further comprises quantities of braze located in part of the plurality of holes as balance weights axially symmetrically different from each other by an amount to improve balance.

4. The squirrel-cage rotor according to claim 3, wherein:
diameters of a plurality of the holes arranged in approximately one circumference around the axis of the rotor are different from diameters of other holes arranged in approximately another circumference, and
diameters of the plurality of holes arranged in approximately the one circumference are the same as each other.

5. The squirrel-cage rotor according to claim 3, wherein diameters of the plurality of holes are the same as each other.

6. The squirrel-cage rotor according to claim 1, wherein:
holes are provided at surfaces of the conductor bars, and the rotor further comprises quantities of braze located in the holes as balance weights symmetrically different from each other by an amount to improve balance of the rotor.

7. The squirrel-cage rotor according to claim 6, wherein:
diameters of the plurality of holes arranged in approximately one circumference around the axis of the rotor are different from diameters of other holes arranged in approximately another circumference, and
diameters of the plurality of holes arranged in approximately one circumference are the same as each other.

8. The squirrel-cage rotor according to claim 6, wherein diameters of the holes are the same as each other.

9. The squirrel-cage rotor according to claim 1, where the quantities of the braze are at two or more connect portions connecting the end ring to conductor bars.

10. The squirrel-cage rotor according to claim 1, wherein quantities of the braze at opposite connect portions across the axis of the rotor are different from each other.

11. A production method for a squirrel-cage rotor for an electric motor, the rotor including a shaft, a plurality of conductor bars circumferentially arranged around the rotary shaft, and end rings including a plurality of slot portions which are attached to the conductor bars, the method comprising steps of:
pressing at portions of outer surfaces of the end rings corresponding to the plurality of conductor bars, and
applying brazing material into the portions to provide a mechanical and electrical connection in one or more quantities to modify rotary balance.

12. The method according to claim 11, wherein:
the squirrel-cage rotor includes a core located between the end rings,
the pressing step uses a pressing part, and
during the pressing step, the pressing part is set at the position in the axis direction of the shaft where the pressing part does not cross the plane of the end surface of the core.

13. The method according to claim 11, further comprising a step of measuring rotary balance of the cage-squirrel rotor, wherein the applying of brazing material applies quantities selected based on a result of the measuring step.

\* \* \* \* \*